United States Patent
Cable et al.

(10) Patent No.: US 6,949,307 B2
(45) Date of Patent: Sep. 27, 2005

(54) HIGH PERFORMANCE CERAMIC FUEL CELL INTERCONNECT WITH INTEGRATED FLOWPATHS AND METHOD FOR MAKING SAME

(75) Inventors: Thomas L. Cable, Newbury, OH (US); Kurt E. Kneidel, Alliance, OH (US); Eric A. Barringer, Lynchburg, VA (US); Thomas C. Yuan, Williamsville, NY (US)

(73) Assignee: SFCo-EFS Holdings, LLC, Alliance, OH (US)

( * ) Notice: Subject to any disclaimer, the term of this patent is extended or adjusted under 35 U.S.C. 154(b) by 692 days.

(21) Appl. No.: 10/042,026

(22) Filed: Oct. 19, 2001

(65) Prior Publication Data

US 2003/0077498 A1 Apr. 24, 2003

(51) Int. Cl.$^7$ .......................... H01M 8/02; H01M 8/24; H01M 2/08
(52) U.S. Cl. ..................... 429/38; 429/35; 429/36
(58) Field of Search .................. 429/34, 35, 36, 429/37, 38

(56) References Cited

U.S. PATENT DOCUMENTS

| | | | | |
|---|---|---|---|---|
| 3,880,670 A | * | 4/1975 | Shinn | 429/38 |
| 5,789,093 A | * | 8/1998 | Malhi | 429/34 |
| 6,171,719 B1 | * | 1/2001 | Roy et al. | 429/39 |
| 6,361,893 B1 | * | 3/2002 | George et al. | 429/34 X |
| 6,376,117 B1 | * | 4/2002 | Kantak et al. | 429/39 |
| 6,511,766 B1 | * | 1/2003 | Loutfy et al. | 429/34 |
| 2003/0039878 A1 | * | 2/2003 | Miyakoshi et al. | 429/34 |

* cited by examiner

Primary Examiner—Stephen J. Kalafut
(74) Attorney, Agent, or Firm—D. Neil LaHaye; Robet C. Baraona

(57) ABSTRACT

A method, apparatus and assembly related to solid oxide fuel cell interconnects is disclosed. In its broadest embodiment, the invention contemplates a multi-layered ceramic interconnect having integrated flow fields and electrical connections. The method of making this interconnect includes judicious selection of materials, formation of appropriate apertures for the flow fields and electrical connectors, and the joining of the layers through a firing and/or sealing process.

88 Claims, 9 Drawing Sheets

HIGH PERFORMANCE CERAMIC FUEL CELL INTERCONNECT WITH INTEGRATED FLOWPATHS AND METHOD FOR MAKING SAME

FIELD AND BACKGROUND OF INVENTION

The present invention is generally drawn to a fuel cell interconnect and more particularly to a multi-layered ceramic interconnect possessing superior design and performance characteristics, as well as a method for making the same.

Demand for electrical generating equipment has increased substantially in recent years. As a result, numerous technologies have been developed to provide electricity, including traditional grid-based systems and more localized, distributed generation systems. Moreover, as demand continues to increase, many anticipate that the demand for distributed generation systems will also increase.

In response to this distributed generation need, particular attention has been paid to fuel cell systems. Fuel cells are electrochemical devices that convert the energy of a chemical reaction directly into electrical energy. The basic physical structure of a single fuel cell includes electrodes (an anode and a cathode) with an electrolyte located there between in contact with the electrodes. To produce electrochemical reactions at the electrodes, a fuel stream and an oxidant stream are supplied to the anode and cathode, respectively. The fuel cell electrochemically converts a portion of the chemical energy of the fuel in the fuel stream to electricity, while the remaining amount of the chemical energy is released as heat. A stack of individual fuel cells is preferably connected in electrical series via a series of conductive interconnects in order to generate a useful additive voltage.

The type of electrolyte used in a fuel cell is generally employed to classify the fuel cell and is also determinative of certain fuel cell operating characteristics, such as operating temperature. Present classes of fuel cells include the Polymer Electrolyte Fuel Cell (PEFC), the Alkaline Fuel Cell (AFC), the Phosphoric Acid Fuel Cell (PAFC), the Molten Carbonate Fuel Cell (MCFC), and the Solid Oxide Fuel Cell (SOFC). In turn, interconnect devices are selected based upon compatibility with the electrolyte.

Current research efforts have focused upon SOFC systems for a variety of safety and performance concerns. For example, in comparison to other types of fuel cells, SOFC systems do not require the presence of corrosive electrolytes. Moreover, SOFC operating temperatures are more efficient and more conducive to integration with internal system components and/or other applications. Finally, given the ability of an SOFC stack to have either a tubular or planar shape, SOFC stacks afford greater design flexibility.

Planar solid oxide fuel cells are an attractive option for meeting the growing need for distributed power generation in a manner which is both energy efficient and environmentally sound. In particular, such systems offer modularity as well as higher fuel efficiency, lower emissions, and less noise and vibration in comparison to other distributed generation systems (e.g., diesel generators, gas turbines, etc.). However, the construction and operating costs of solid oxide fuel cells must compare favorably with these alternative power sources. Thus, in order to be widely accepted for distributed generation applications, solid oxide fuel cells must be able to cost-effectively produce electricity, as well as efficiently utilize the heat energy required to operate the cell.

Ideally, fuel cell performance should depend only on the fuel composition and the amount of fuel consumed at the anode side. Consequently, proper distribution of the reactant gases to the various parts of the cell is of particular concern. Various designs of anode-electrolyte-cathode tri-layers and associated flow passages are available for constructing fuel cell stacks. The most common configuration is the planar design having multiple layers of cell units stacked therein. The fuel and oxidant (e.g., air) respectively flow past the surface of the anode and cathode placed opposite the electrolyte. This arrangement allows the anode surface to be in direct contact with the fuel, and the cathode surface to be in direct contact with air. The flow passages for each gas can be connected to inlet and outlet manifolds on both the anode and cathode sides. Additional external baffles may also be provided to help channel the flow of reactant gases.

Generally speaking, the fuel is consumed due to electrochemical reactions as it passes across the anode from the inlet to the outlet. One function of the interconnect in a fuel cell stack is to insure distribution of fuel to all active areas of the cell. During cell operation, fuel must be supplied to even the most fuel-starved portions of the cell in a quantity sufficient to insure the proper operation of that fuel-starved portion. As a result, excess fuel is ultimately supplied to the entire cell in order to meet the demands imposed by the fuel-starved portions of the cell. This excess fuel usage has a negative impact on the overall cell and stack efficiency. Consequently, stack performance can be enhanced by improving the flow distribution of reactant gases within the cell.

Notwithstanding the issues associated with the negative impact of improper reactant flow on performance, SOFC interconnect functionality and interconnect cost actually constitute the greatest barriers to producing market competitive SOFC systems at present. In contrast to the flow patterns discussed above, the interconnect must provide reactant gas separation and containment, mechanical support to the cells, and a low resistance path for electrical current. Moreover, the reactant gas flow channels associated with the interconnect must be designed to control distribution of reactants with minimal pressure drop in the overall SOFC stack, especially in respect to the air flow channels of the interconnect because of the relatively high air flow rates required to dispose of heat from the stack. Finally, when integrated into the stack, each interconnect must be resistant to deleterious reactions (such as corrosion), dense to provide adequate gas separation of the reactant gases and still strong enough to minimize the effects of displacement cause by differential thermal expansion.

Monolithic interconnects made of lanthanum chromite ceramics and high-temperature metallic alloys have been used to address these problems with some amount of success. However, both types of interconnects are expensive and compromise aspects of the interconnect function. Moreover, lanthanum chromite and high-temperature alloys (for example, high chrome alloys) used in a conventional monolithic interconnect design are currently cost-prohibitive, although use of lanthanum chromite interconnect could theoretically allow for a marginally competitive product, assuming a regular, high production volume was needed and net-shape ceramic processing was used. In any event, lanthanum chromite provides a specific illustration of the basic conundrum in SOFC commercialization—the chilling effects of production start-up costs coupled with the initially small market size.

The gas separation requirement presents another problem in terms of materials selection. Obviously, the interconnect must present a barrier to separate the various gases flowing therethrough. Thus, a dense impermeable material with high electronic conductivity but almost no ionic conductivity must be used. Although ceramic processing has developed the capability to produce interconnects of sufficiently high density, many ceramics, including lanthanum chromite, have an unacceptably high ionic conductivity (thereby resulting in poor system performance). Many electrically conductive ceramic materials also exhibit undesired dimension changes when subjected to reducing gas atmospheres due to the loss of oxygen ions within the material. Alternate compositions of ceramic materials possessing low ionic conductivity generally have less than acceptable electronic conductivity or have a coefficient of thermal expansion (CTE) that is not well matched to that of the cell.

In contrast, metallic alloy interconnects have been developed that readily satisfy the gas separation function, but they generally do not exhibit adequate resistance to corrosion (and other deleterious reactions). In particular, oxide scale growth/formation and unacceptably high electrical resistance are probably the most challenging hurdles presented by known metal interconnects. Scale resistance is a function of oxide conductivity, thickness and continuity. Porous or laminar scales have the effect of increasing the current path length while reducing the effective current carrying cross sectional area. The mechanism for scale growth and conductivity are interrelated such that growth rate generally increases with scale conductivity. Higher growth rates tend to produce less dense, poorly adherent scales. Most alloys (except noble or semi-noble metals) actually trade advantageous scale conductivity for increased degradation because of scale growth. Coating the interconnect with a conductive oxide layer provides more control of the scale composition and microstructure, but does not change the basic nature of the problem. The application of coatings to alloy interconnects also increases the fabrication cost.

Regardless of the choice of ceramic or metallic interconnect, a close match of the cell and interconnect coefficients of thermal expansion is an absolute requirement. A close match of the CTE allows for the effective sealing of individual cells to interconnects and the concurrent containment of the reactant gases therein. Too large of a mismatch of CTE results in certain regions of the cell becoming adversely displaced. This physical displacement prevents effective confinement of the reactant gases within their intended flow paths, thereby adversely effecting performance of the entire SOFC stack. While changes between room and operating temperatures (generally in the range of 700 to 1000° C.) produce the largest thermal displacements, smaller temperature gradients across the stack (which vary with stack operating conditions) can also create detrimental displacements.

Dissimilar thermal expansion characteristics may also cause disruption of the electrical current path between cells and interconnects in a stack because of the relative movement of the contact points. Essentially, this loss of contact creates additional, unwanted resistance which substantially degrades stack performance and efficiency.

Most alloy interconnects also have a higher CTE in comparison to the other cell components. As a result, metallic alloy interconnects are particularly susceptible to contact resistance problems because the relative motion caused by expansion can dislodge a protective oxide scale and expose underlying unprotected metal. In turn, oxidation of any unprotected surface increases the overall scale thickness, and as mentioned above, the scale conductivity is comparatively poor so that such scale growth contributes directly to performance degradation. Additionally, oxide scales can adhere to the electrodes adjacent the interconnect. In such cases, relative motion can actually crack or damage the electrodes or the electrolyte layer itself.

In contrast, lanthanum chromite does not experience the same problems as alloy interconnects. Generally, the CTE of chromite ceramic interconnects is more closely matched to the cell; however, other concerns make these interconnects less attractive.

U.S. Pat. No. 6,183,897 to Hartvigsen et al., and assigned to SOFCo, a wholly owned subsidiary of McDermott Technology Inc., attempts to address some of the problems above. Its entire disclosure is incorporated by reference herein.

Hartvigsen proposes a ceramic SOFC interconnect with electrically conductive filled vias penetrating a gas separator plate. While Hartvigsen's design provides the resulting cell/stack with the gas separation qualities (by way of the separator plate) and excellent current collection and conduction (by way of the filled vias), Hartvigsen fails to discuss any means for optimizing the reactant flowfields, nor does it imply these items could be integrated into the interconnect itself. Likewise, Hartvigsen does not consider the complexities involved in providing a thermally compliant interconnect structure (e.g., column 6, lines 1–12).

U.S. Pat. No. 6,376,117 entitled "Internal Fuel Staging For Improved Fuel Cell Performance," contemplates the inclusion of staging plates within the fuel cell stack to enhance reactant gas distribution along the tri-layer. However, the staging plates of this pending application must be provided separately from the interconnect itself, and the application fails to consider any sort of integrated structure. Notably, at present, this application is assigned to the same inventive entity as the present invention, and its entire disclosure is incorporated by reference herein.

Given the above, an interconnect which is well-matched to the components of an SOFC stack would be welcome. In particular, an interconnect which provides adequate flowpaths for the reactant gases and permits selective control of the performance of the cells/stack is especially needed.

SUMMARY OF INVENTION

The present invention provides an interconnect for a solid oxide fuel cell consisting of multiple ceramic layers. These multiple layers perform two distinct functions: separation and containment of the reactant gases by way of a multilayer ceramic article; and collection and conduction of electrical current produced by the adjacent anode-electrolyte-cathode tri-layer by way of conductive vias. The via material must have sufficient conductivity so that the electric current can flow through the interconnect from one cell to an adjacent cell with minimal resistive losses. Air and fuel gas separation is accomplished using one or more dense ceramic layers having dense conductive filled vias integrated therein. Air and fuel flow passages are formed using multiple ceramic layers on each side of the separator layer(s). Overlapping holes (or other structures such as slots) in adjacent layers produce the required reactant flow channels. The size and spacing of the holes (or slots) and the thickness of the layers determines the gas flow distribution and the pressure drop.

Thus, it is an object of the present invention to provide an interconnect for a solid oxide fuel cell that permits substantial matching of the cell and interconnect coefficients of thermal expansion. It is a further object of the invention to provide an interconnect manufactured using multiple ceramic layers and including conductive vias for current flow, coupled with interconnected channels for flow of reactant gases. Yet another object of the present invention is to divide the interconnect functions of gas separation and containment from the current carrying function, thereby permitting more particularized selection of materials that are better suited to each function and its operating environment. A final object of the present invention is to provide an interconnect whereby the distribution of conducting vias and dimensions of flow channels can be tailored such that temperature gradients across a solid oxide fuel cell stack are minimized during operation.

The invention itself is preferably manifested in three distinct embodiments. The first is a solid oxide fuel cell assembly comprising: first and second fuel cell layers having an anode, a cathode and an electrolyte layer separating the anode and the cathode; a separator plate with a defined thickness; a first flow field element located between the top of the separator plate and the first fuel cell layer; integrated means for delivering a reactant gas through the first element and to the first fuel cell layer within the first flow field element; a second flow field element located between the bottom of the separator plate and the second fuel cell layer; integrated means for delivering a reactant gas through the second element and to the second fuel cell layer within the second flow field element; and integrated means for conducting an electrical current from the first fuel cell layer through the first flow field element, the separator plate and the second flow field element. The flow fields and/or separator plate may be made of various types of ceramics. The means for conducting electrical current may take the form of conductive vias and/or a conductive coating applied to the exposed outer surfaces of the flow field elements. The means for delivering reactant gases may include apertures, which themselves can be manipulated to favorably impact the performance of the assembly. A sealing means can also be employed to further enhance operation of the assembly.

The second embodiment involves a layered interconnect apparatus. This apparatus is made up of: a first set of flat plates with a pattern of apertures on each and a first means for conducting an electrical current through the entire first set, this first set also being arranged in a stack so that the apertures of each plate form a tortuous flowpath for a first reactant gas; a second set of flat plates with a pattern of apertures on each and a second means for conducting an electrical current through the entire second set, this second set also being arranged in a stack so that the apertures of each plate form a tortuous flowpath for a second reactant gas; at least one separator plate having a series of filled conductive vias electrically connected to the first means for conducting an electrical current on one side of the separator plate and connected to the second means for conducting an electrical current on an opposite of the separator plate, the separator plate also being positioned between the first set of plates and the second set of plates so as to segregate the first reactant gas from the second reactant gas. As above, this interconnect may be made of specific ceramics. The means for conducting electrical current can also take the form of vias and/or coatings of various different conductive compositions. The dimensions and/or shapes apertures can be altered to enhance performance. An additional plenum and/or set of orifices may also be associated with the inlets for the reactant gases.

The third embodiment is directed to a method of making an interconnect apparatus. This method for constructing an interconnect apparatus for use in a fuel cell stack includes: providing a plurality of flat members capable of forming a separate reactant gas flow field; providing an impermeable separator plate; forming a pattern of apertures on each flat member; providing a material capable of conducting an electrical current to the separator plate and to at least a portion of the flat members; stacking the flat members on both sides of the separator plate so as to surround the separator plate; aligning the flat members on each side of the separator plate so as to insure a viable electrical connection exists throughout the flat members and the separator plate and so as to insure the pattern of apertures in the stacked members forms a tortuous flow field for reactant gases on each side of the separator plate; and sealing the stacked and aligned flat members and separator plate to insure that reactant gases are contained within the tortuous flow field on each side of the separator plate. Similar to the first tow embodiments (and as will be described in detail below), further modifications can be made with respect to the materials selected (for the flat members, the separator plate and the conductive materials used in each), the methods for aligning the flat members and the options for sealing the final stack.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which several preferred embodiments of the invention are illustrated.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

Figure 1:
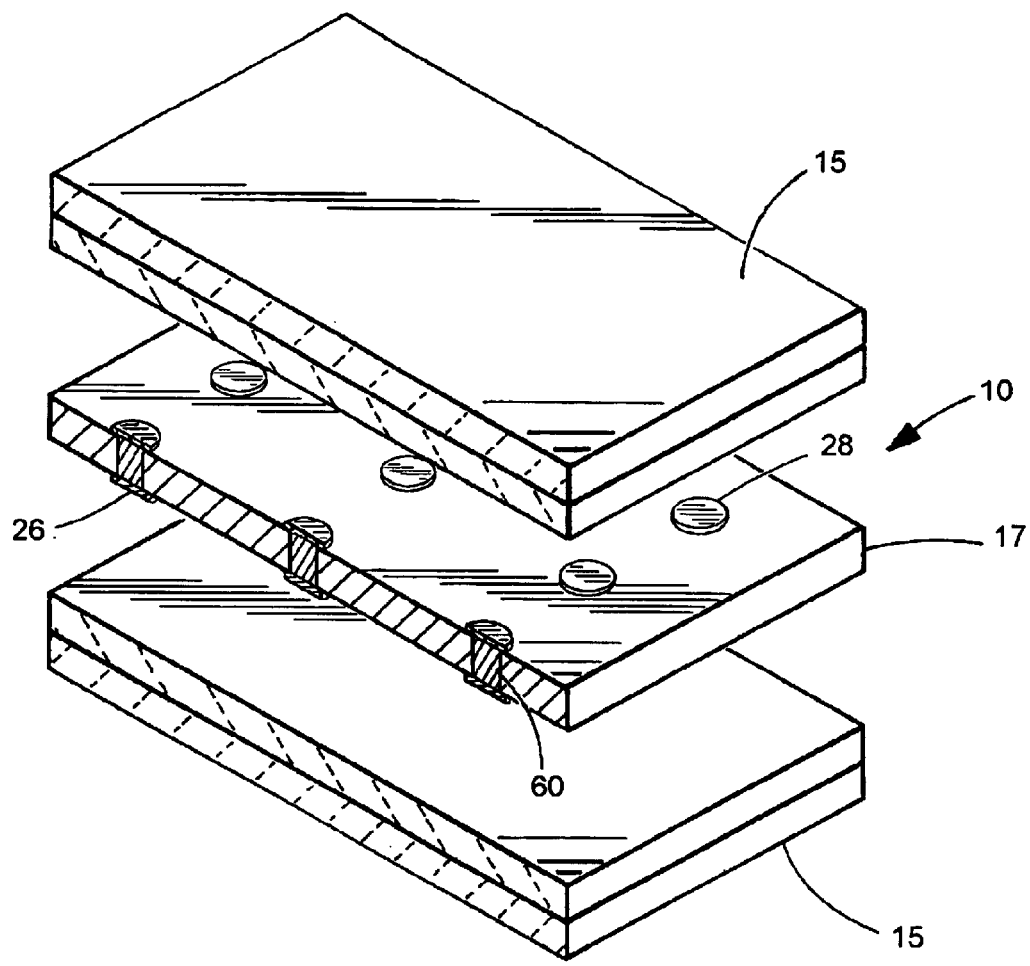
FIG. 1 is a layered perspective view of the SOFC interconnect contemplated by Hartvigsen et al.

FIG. 1 shows the interconnect contemplated by Hartvigsen et al. Essentially, SOFC stack 10 comprises a series of tri-layer fuel cells 15, each having an anode and a cathode separated by an electrolyte. Interposed between each tri-layer 15 is a via-filled separator plate 17. Running through the separator plate itself are a plurality of vias 60 made of any suitable conductive material. Vias 60 are capped on either end by contact points 26, 28. Each contact point 26, 28 is constructed from the same material as via 60. More importantly, each contact point 26, 28 protrudes from the surface of the separator plate 17 so that when the elements are stacked together, flow passageways are created on either side of tri-layer 15 through which the appropriate reactant gas is provided to the components of stack 10.

Figure 2:
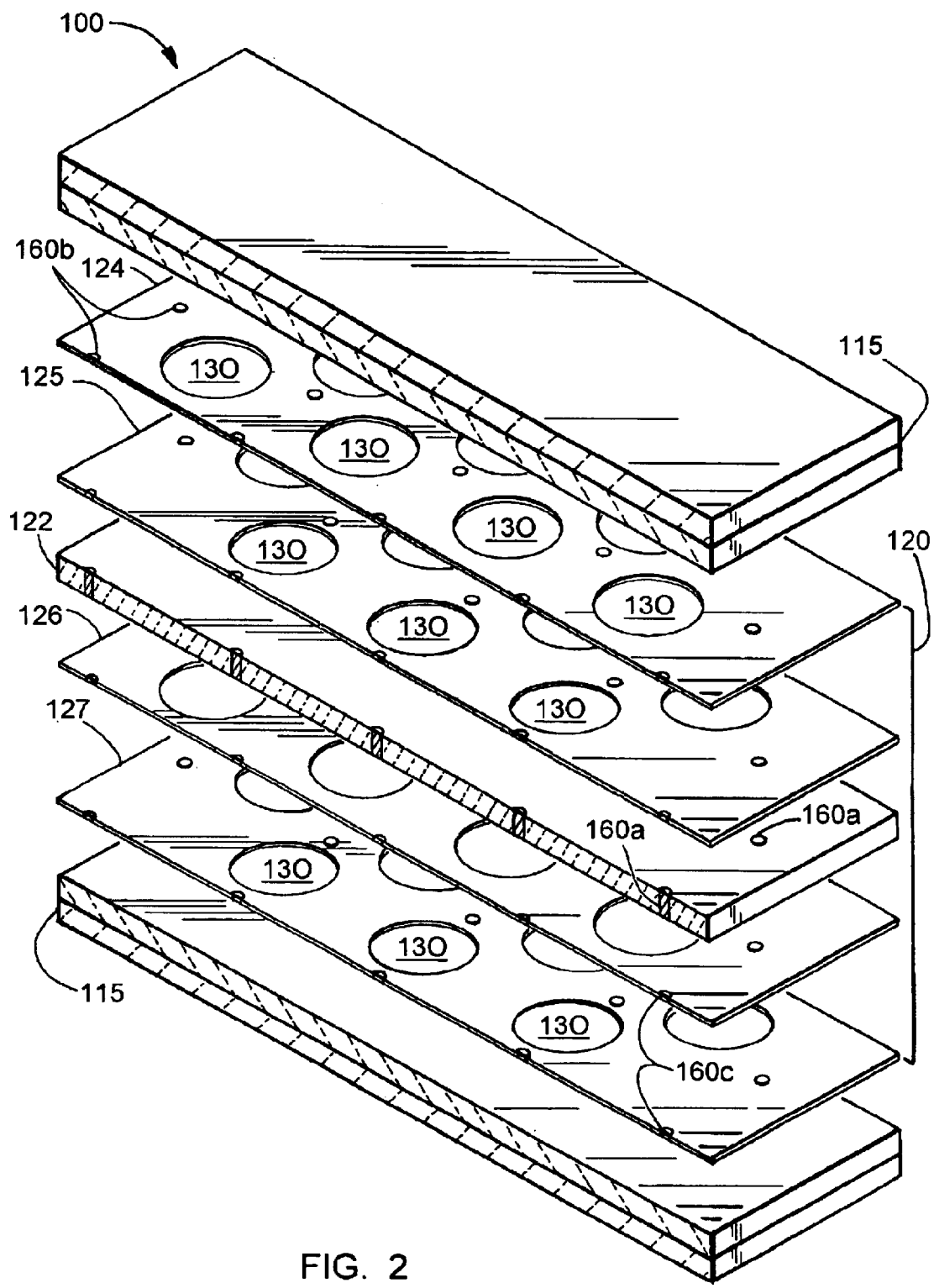
FIG. 2 is a layered perspective view of one embodiment of the present invention.

FIG. 2 illustrates the present invention in contrast to the stack described above. In particular, a solid oxide fuel cell stack 100 has an essentially monolithic structure, including a plurality of tri-layer fuel cell 115 and at least one multi-layer interconnect 120. Multi-layer interconnect 120 preferably comprises separator plate 122 interposed between a plurality of perforated ceramic sheets 124, 125, 126, 127 (described in greater detail below). Notably, both separator plate 122 and sheets 124–127 have conductive vias 160*a*, 160*b*, 160*c* (similar to those contemplated by Hartvigsen) extending therethrough. Depending upon desired conductivity, vias 160*a*, 160*b*, 160*c* may be filled (i.e., dense) or only partially filled. Vias 160*a*, 160*b*, 160*c* form an electrical connection between each tri-layer 115. Apertures 130 (also described in greater detail below) are provided within the ceramic sheets 124–127 in order to create reactant gas flow channels. Notably, while the embodiment in FIG. 2 is shown as comprising a stack having one interconnect and two tri-layer cells, it is understood that, depending on the requirements for a particular application, a stack may comprise any number of tri-layer cells and corresponding interconnects. Likewise, any number of ceramic sheets may be used to form the multi-layer interconnects.

As shown in FIG. 2, each tri-layer 115 comprises a discrete fuel cell, including an electrolyte, an anode, and a cathode. Conducting bond layers (not shown in FIG. 2) may be applied across the entire surface of either or both of the anode and the cathode in order to promote electrical contact, current distribution and structural integrity between the tri-layer 115 and the interconnect 120. As will be understood by those familiar with the art, the electrolyte, anode, cathode, anode bond layer and cathode bond layer may comprise a variety of combinations of materials that are well known in the art. It is anticipated that this invention will have particular applicability to solid oxide fuel cell stacks. Also, it is important to note that the elements of FIG. 2 are not necessarily drawn to scale, and the relative thickness of each layer may vary considerably from the illustration.

Gas separator plate 122 is preferably comprised of one or more layers of dense ceramic material that includes a plurality of conducting vias 160*a*. Notably, vias 160*a* in the separator layer(s) should be sufficiently dense enough to minimize gas leakage through the separator plate 122 itself. Many different ceramic compositions may be utilized for the gas separator layer(s), so long as the gas separator is impermeable, has minimum ionic conductivity, can withstand the operating temperature and is stable with respect to the reactant gases. As seen in FIG. 2, vias 160*a* must extend through the entire plate 122 in order to form electrical conduction paths with the air and fuel vias 160*b*, 160*c* located on the ceramic sheets 124–127.

The reactant gas flow fields for stack 100 are integrated within the interconnect structure 120. In essence, each of the two flow fields (i.e., air-side and fuel-side) comprises one or more layers of ceramic material that includes a plurality of conducting vias 160*b*, 160*c* similar to those contained within the separator plate 122. Vias 160*b*, 160*c* must both be electrically connected to at least some of the vias 160*a* and to the tri-layers 115 (or the bond material interposed between the interconnect 120 and the tri-layer 115). Many different ceramic compositions may be utilized for the flow layer(s), so long as they are compatible with the separator layer(s) and the tri-layer 115 or the bond material (see the examples below for a more detailed discussion).

For example, the separator, fuel flow structure and air flow structure may comprise a yttria stabilized zirconia (YSZ), such as a 3 mole percent yttria stabilized zirconia. Other potential ceramic materials include alumina, magnesium alumina spinel, lanthanum chromite or mixtures of these materials with YSZ (note that these examples are merely illustrative, rather than exclusive, as those skilled in the art can readily identify numerous ceramic materials which are compatible for use in SOFC stacks). Notably, in contrast to the dense separator plate 122, there is no specific density requirement for the sheets 124–127 (in some cases, it may even be desirable to use a relatively porous ceramic to further promote reactant flow). Likewise, while the methodology of assembling the stack may make it desirable to use the same material for the separator plate 122 and the sheets 124–127, there is no specific requirement to have the same type of material used throughout (e.g., it could be possible to use YSZ for the separator and some other material, such as a YSZ-alumina composite for the perforated ceramic sheets, etc.).

Figure 3A:
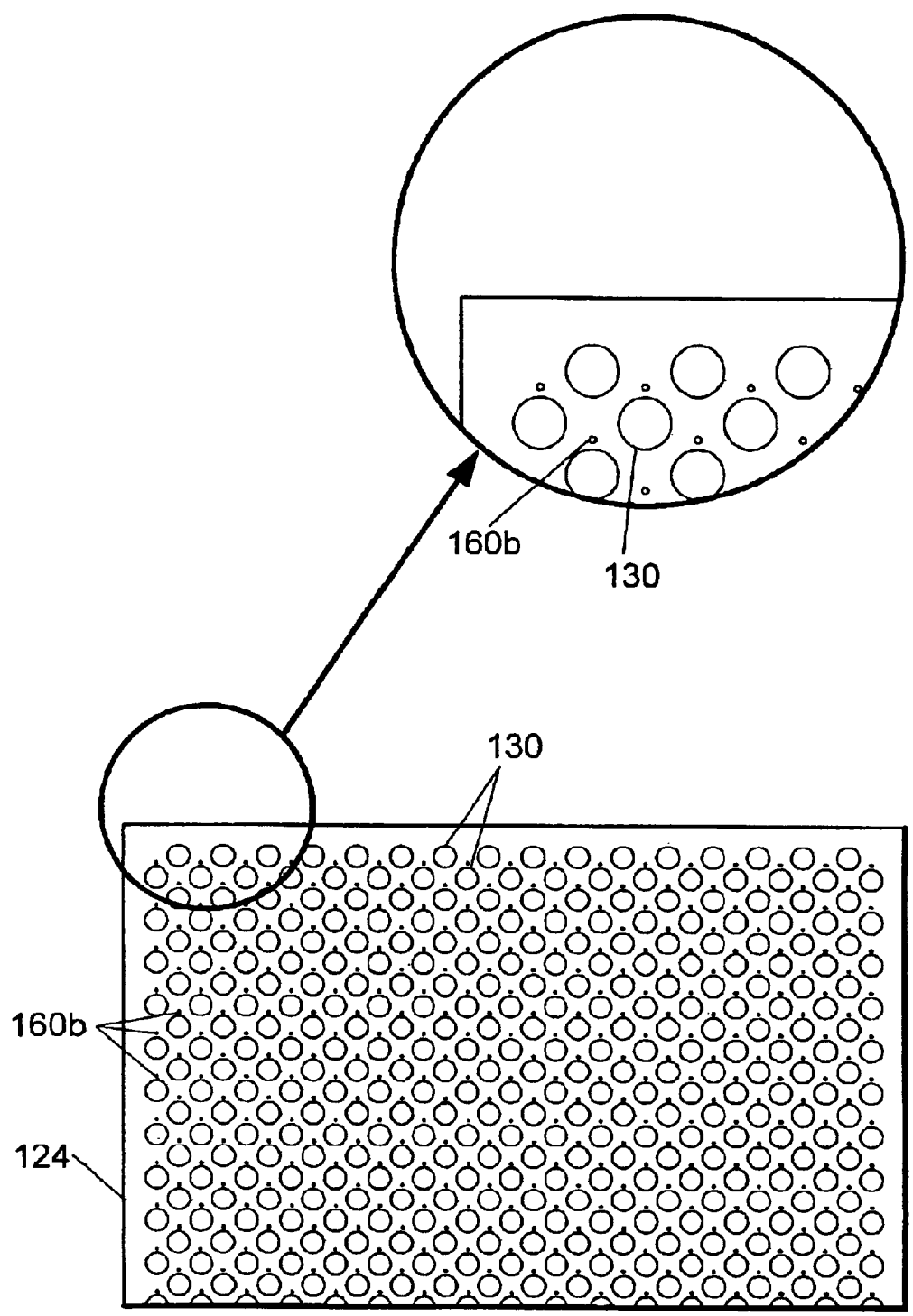
FIGS. 3a and 3b are top views of the perforated ceramic sheets of the present invention.
Figure 3B:
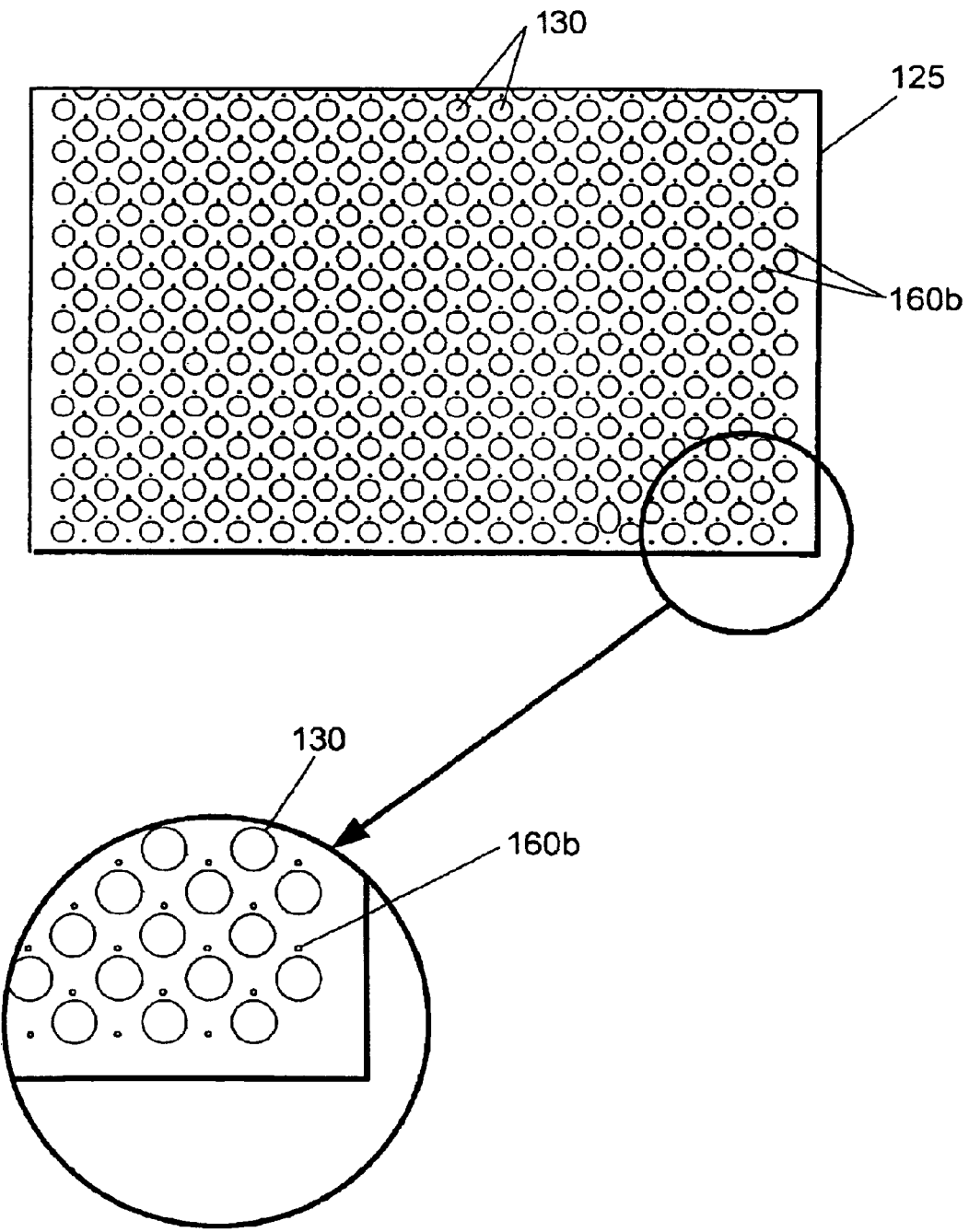
Figure 3C:
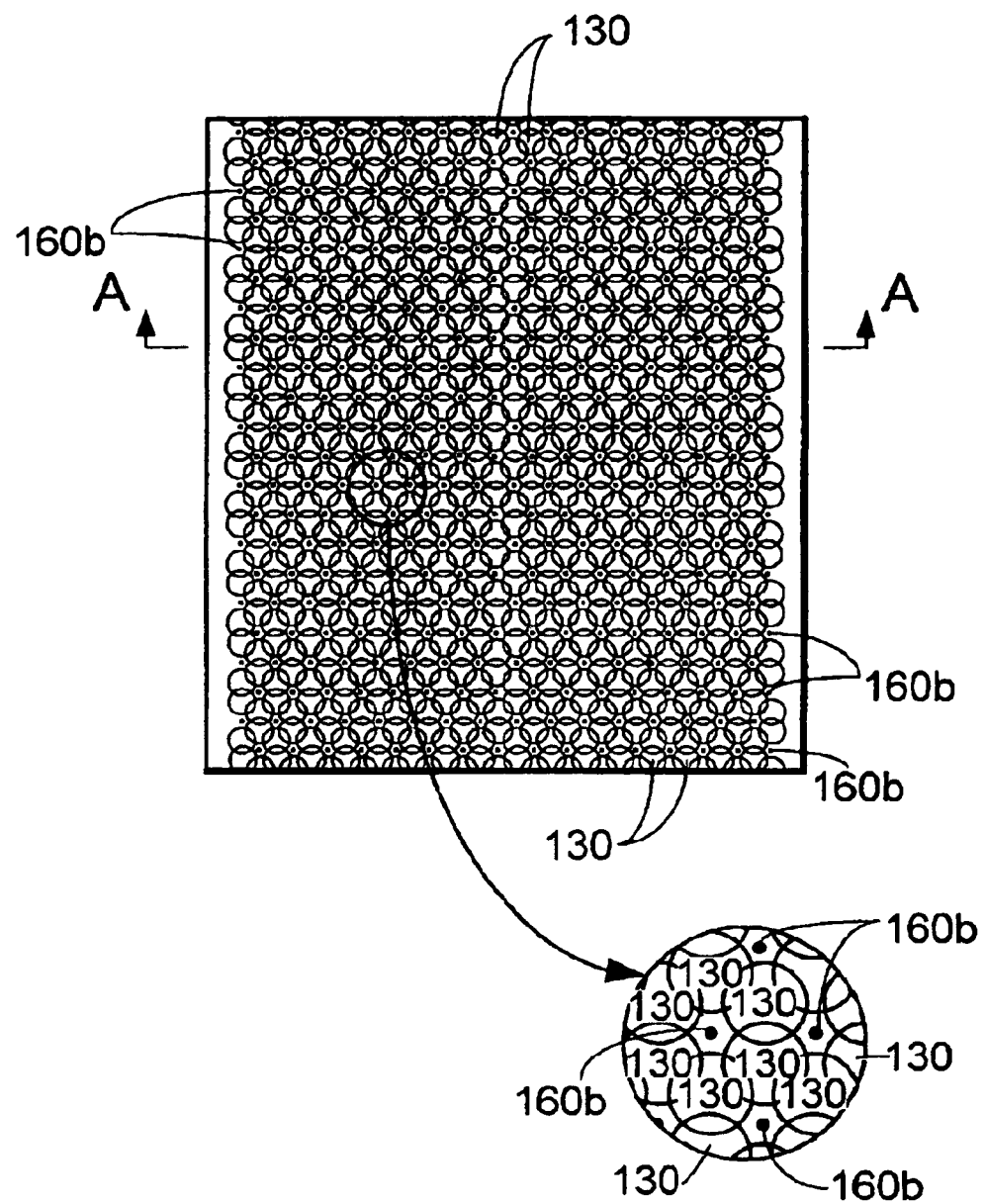
FIG. 3c is a top view of the preferred combination of the ceramic sheets pictured in FIGS. 3a and 3b.

Gas flow passageways are created in one or more of the ceramic sheets 124–127 by creating perforations 130 therein. The perforations 130 overlap on each adjacent sheet so as to form a tortuous path that contacts both the surface of the tri-layer/bond material and the separator plate 122. FIGS. 3*a*–3*c* illustrate a preferred orientation of the perforations relative to each sheet. In particular, FIG. 3*a* shows sheet 124, FIG. 3*b* shows sheet 125 and FIG. 3*c* showing how sheets 124, 125 are overlaid. The actual number, size and shape of the holes may be varied for numerous purposes, as will be discussed in greater detail below.

The vias 160*b*, 160*c* can be distributed uniformly through the ceramic layers 124–127 to provide for optimal current flow throughout the cell stack 100 (FIG. 2). The perforations 130 are preferentially arranged in an approximately hexagonal array within each ceramic layer in a manner such that they overlap to create continuous passageways through the two layers. FIG. 3*c* shows one possible arrangement contemplated by the present invention.

Figure 3D:
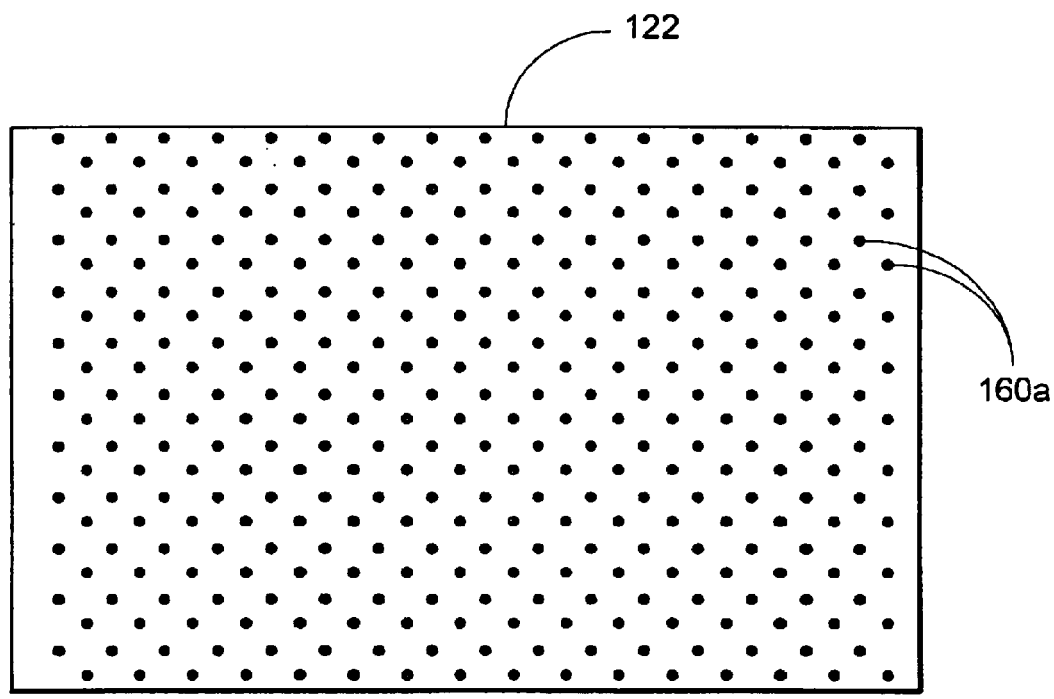
FIG. 3d is a top view of the gas separator plate used in conjunction with the combination pictured in FIG. 3c.

FIG. 3*d* illustrates the gas separator plate 122 that would be used in conjunction with the configurations of FIGS. 3*a*–3*c*. As with the ceramic sheets 124, 125 shown in FIGS. 3*a* and 3*b*, the vias 160*a* of the separator plate 122 are arranged in an essentially hexagonal pattern. Significantly, FIG. 3*d* is devoid of any perforations, such that gas coming into contact on either side of plate 122 is prevented from flowing therethrough.

Figure 4A:
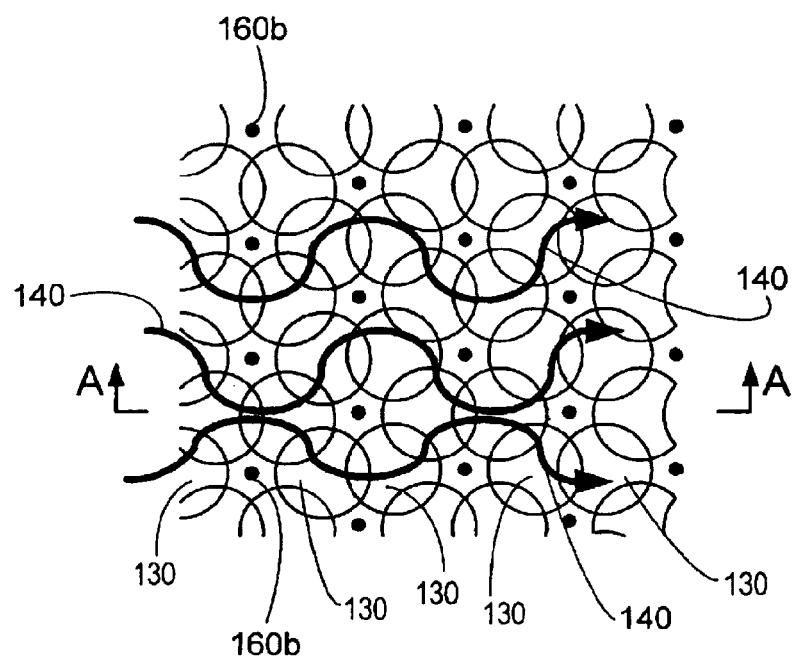
FIG. 4a is a top view of two stack ceramic sheets of the present invention showing the reactant gas flowpath.
Figure 4B:
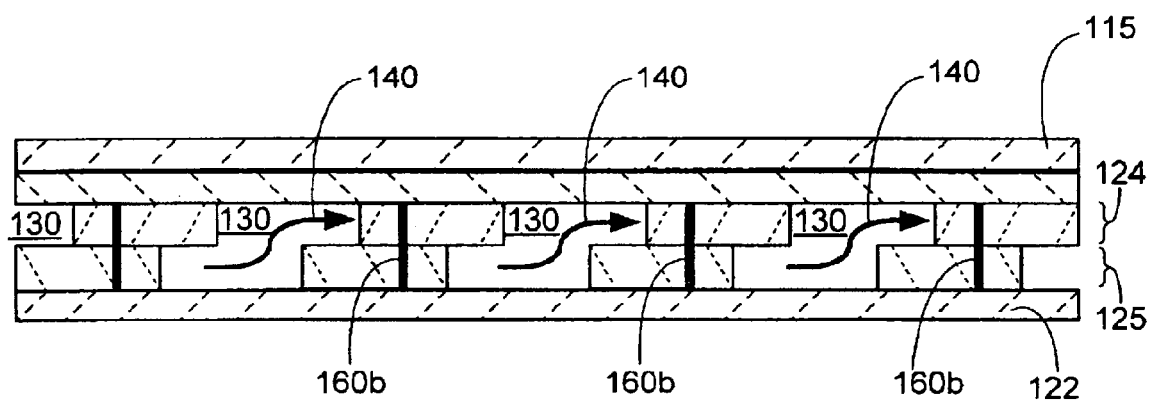
FIG. 4b is a cross sectional side view taken along line A—A of FIG. 4a showing the reactant gas flowpath.

The reactant gas flows through such a two-layer structure in a serpentine pattern 140, as partially illustrated in FIGS. 4*a* and 4*b*. For reference, FIG. 4*a* is actually a top view of overlaid ceramic sheets, as seen in FIG. 3*c*. Line A—A has been included on FIG. 4*a* for particular reference to the remaining drawings. It is important to bear in mind that all other reference elements are the same as in the other drawings presented herein. Most significantly, line 140 has also been included to illustrate the serpentine flowpath of the reactant gases moving horizontally through the interconnect structure 100.

FIG. 4*b* shows a side view of FIG. 4*a* taken along line A—A. As above, the flow field structure is comprised of two or more layers of ceramic material 124, 125 (or 126, 127)

that includes a plurality of perforations 130. Line 140 illustrates the serpentine flowpath of the reactant gases moving through the interconnect structure 100.

Therefore, when reactant gas flowpath 140 from FIGS. 4a and 4b are considered together, it becomes apparent that reactant gases move through interconnect structure in a three-dimensional, tortuous flowpath. Specifically, in the example above, this flow is similar to a spiral, although virtually any flowpath is contemplated according to the principles described herein.

Figure 5:
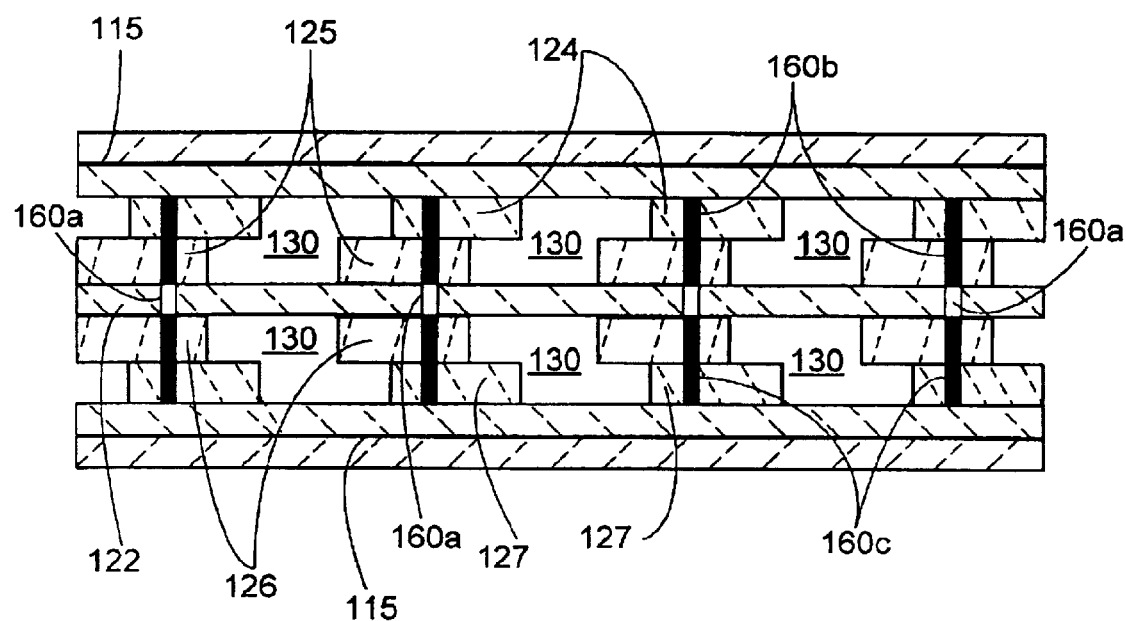
FIG. 5 is a cross sectional side view taken along line A—A of FIG. 4a showing a straight-through via alignment of the present invention.

In one embodiment, the vias 160a, 160b, 160c are aligned in order to provide an effective pathway for electronic conduction, as shown in FIG. 5. Note that the cross sectional view in FIG. 5 is taken along a line similar to line A—A shown in FIG. 4a in order to show the relative orientation of vias 160a, 160b, 160c.

The number of ceramic layers used for the fuel gas and air flow structures and the thickness of each layer can be altered according to the relative electrical and physical properties of the desired interconnect/fuel cell stack. Specifically, use of three or more layers on each side of the gas separator plate may allow for the provision of discrete passageways to enhance the distribution of the reactant gases. In this arrangement, a portion of the reactant gas(es) would flow through the interconnect flow field (i.e., the perforated ceramic layers) without coming into contact with the tri-layer until the gas was at a downstream point relative to the location of where the remaining portion of the gas first came into contact with the tri-layer. In essence, the perforations and/or number of ceramic sheets would be utilized to create bypass channels to ensure even reactant distribution along the face of the tri-layer. Insofar as these bypass channels would be integrated into the interconnect itself in order to simplify construction and enhance performance (in comparison to the additional staging plates as contemplated in U.S. Pat. No. 6,376,117), the present invention represents a marked improvement over that patent. Notably, even with this alternate arrangement, it is important to provide conductive vias for current flow in a uniform, regular manner in order to avoid degradation of stack performance.

The number, size, arrangement and placement of the perforations 130 within each layer can also be optimized to control the flow distribution of gases through the passageways and the overall pressure drop through the stack. Corresponding effects on the area specific resistance (ASR), temperature gradients and overall performance of each adjacent tri-layer may also be favorably manipulated.

For example, by increasing the size of the perforations 130 in areas of high electrochemical activity, the localized pressure drop across the surface of each tri-layer may be reduced. This reduction of pressure drop would increase the local flow rate of reactant gases, thereby increasing the concentration of reactants available in the high activity areas.

Likewise, careful manipulation of the relative flow patterns of the fuel gas versus the air can result in performance alteration. For example, a cross-flow arrangement may be used, where the general flow pattern of fuel gas is perpendicular to the flow of air. Similarly, co-flow and counter-flow arrangements may be utilized. In each case, a corresponding effect on the reactivity and temperature gradient on each tri-layer surface (or bond material applied thereto) will be observed.

Finally, the shape of the perforation 130 may be altered to simplify assembly. As discussed in greater detail below, the precise method for creating each ceramic sheet can dictate the easiest and most efficient shapes for the perforations and those skilled in the art will readily understand the impact that use of using circular, oval, triangular, rectangular, hexagonal or other polygon shapes (and/or combinations thereof) will have on the flow patterns. Additionally or alternatively, the hole size may be selected to favorably impact the pressure drop, with holes of varying sizes being used across the flowpath of the cell (thereby resulting in increased or decreased flow rate as the reactant gas passes across the surface).

In sum, an array of overlapping holes should provide for uniform distribution of reactant gases over the tri-layer cells 115 within the stack 100. Alternatively, it may be desirable to utilize non-uniform arrays of holes to alter the reactant gas flow patterns in order to compensate for temperature gradients, flow deficiencies and similar non-uniform phenomena occurring at the surface of each tri-layer 115. Ultimately, the advantages in solid oxide fuel cell stack operation by providing for controlled reactant gas distribution can be readily understood by one skilled in the art.

As shown in FIGS. 2, 3a–3d, 4 and 5, conducting vias 160a, 160b, 160c are comprised of openings that extend through each ceramic layer comprising the interconnect that are filled with a conducting fill material. Various dimensions and shapes of the vias are contemplated. While the Figures illustrate a regular array of vias, both uniform and non-uniform arrangements, shapes and sizes of vias are contemplated by this disclosure.

Generally speaking, fuel-side vias are included in the fuel flow structure of the interconnect (i.e., the flow structure created on one side of the separator plate). The fuel-side via material should have a high electronic conductivity and be chemically compatible with the ceramic layers, such that no deleterious reactions occur during interconnect fabrication. The via material must also be compatible with the via material used for the gas separator and the anode (or anode bond layer, if present) of the adjacent tri-layer cell. In addition, the fuelside via material must be stable in a reducing fuel gas atmosphere during operation of the solid oxide fuel cell stack. Fuel-side via materials include, but are not limited to, noble metals, such as silver, palladium, gold or platinum, or alloys formed from these metals, nickel, chromium or high-chromium alloys and ceramic-metal composites (cermets) prepared by combining the any such metals with ceramic materials, such as alumina, magnesium aluminum spinel, ceria, YSZ, titania, doped-titania and other such n-type oxide conductors.

A bonding layer and/or fuel-side contact pad may be formed on the outer surface of the fuel flow structure and in contact with the fuel-side vias. Such a layer will ensure good electrical connection between the anode (or anode bond layer, if present) and the interconnect. If used, the bonding layer material must be compatible with the materials in which it comes into contact, either during interconnect manufacture or during stack operation. Specifically, these materials include those materials used for fuel-side vias and the anode material.

Similarly, air-side vias are included in the air flow structure of the interconnect (i.e., the flow structure created on the other side of the separator plate, opposite the aforementioned fuel flow structure). The air-side via material should have a high electronic conductivity and be chemically compatible with the ceramic layers. The via material must also be compatible with the via material used for the gas separator and the cathode (or cathode bond layer, if present) of the adjacent tri-layer cells. In addition, the air-side via material must be stable in an oxidizing atmosphere (e.g., air) during stack operation. Air-side via materials include, but are not limited to, noble metals, such as silver, palladium, gold or platinum, or alloys formed from these metals, and cermets prepared by combining any such metals with ceramic materials, such as alumina, magnesium alumina spinel and YSZ. Conducting oxide ceramics, including p-type conductors, Sn or Pr-doped indium oxide and/or oxides such as those generally classified as being in the perovskite family, or mixtures of such ceramics and the aforementioned metals may also be used. By way of example and not limitation, such perovskites include, doped rare earth manganites, doped rare earth cobaltites, and doped rare earth ferrites, and mixtures thereof. Other oxide conductor compositions include mixtures of indium oxide, zirconium oxide, praseodymium oxide, tin oxide and titanium oxide.

An air-side bonding layer or contact pad may be formed on the outer surface of the air flow structure and in contact with the air-side vias. Such layers ensure good electrical connection between the cathode (or cathode bond layer, if present) and the interconnect. If used, the air-side bonding layer material must be compatible with the materials in which it comes into contact, either during interconnect manufacture or during stack operation. Specifically, these materials include those materials used for air-side vias and the cathode material.

The gas separator vias must be compatible with the ceramic material comprising the separator. On the fuel side, the via material must be compatible with the fuel-side vias and a reducing gas atmosphere. On the air side, the via material must be compatible with the air-side vias and an oxidizing gas atmosphere. While a single separator via material is preferred, it is contemplated that two different via materials may be utilized within the same via aperture, especially in the event that differing via materials are used on the fuel side and air side (a material capable of withstanding oxidation would be exposed on the air side of the separator and a fuel-compatible material would be exposed on the fuel side of the separator; the differing materials would electrically contact each other within the aperture of the separator plate itself). Clearly, in such a case, the two via fill materials in the gas separator must be compatible with each other and with the material which forms the separator plate itself.

As with the variations in the size, shape and arrangement of perforations, judicious selection of the vias' properties can result in optimization of the ASR and overall performance of each trilayer. In particular, based upon observations or experience with a certain stack design, it is possible to provide a lower overall resistance for the vias on certain areas of the interconnect in order to overcome limitations caused by high ASR. This lower resistance can be achieved by increasing the relative number of vias, by increasing the diameter of the vias, by using a higher performance material for certain vias and/or by enhancing the contact points for certain vias in relation to the others within the cell stack.

Similarly, while the preferred embodiment contemplates filled vias, it is equally possible to only partially fill the vias and/or to provide a bore coating in addition to or in place of each via without departing from the principles of this invention. Accordingly, the edges of at least a portion of the perforations would be coated with a conducting material in order to create an electronic conduction pathway which would serve as the filled via(s). These bore-coated vias minimize the need for precise alignment of the vias during construction, although their use may increase the materials cost (depending upon the type of material used for the via). In any event, it is important to remember that a bore coating, on the perforations of the ceramic sheets and/or on the vias themselves, may be used in place of or in conjunction with solid-filled vias. Bore-coated perforations 132 are shown in regions X and Z of FIG. 6. Region X depicts the use of coating 132 in place of ceramic sheet filled vias 160b, 160c while Region Z shows the use of coating 132 as a supplement to filled via 160b, 160c. Note that the cross sectional view in FIG. 6 is taken along a line that illustrates the positioning of the vias (rather than the flow fields as seen in FIG. 4).

In fabricating the multi-layer filled-via interconnects, a number of different via alignments are possible. FIGS. 2, 3a–3d, 4 and 5 show a basic "straight-through" via alignment where vias within the fuel flow structure, gas separator and air flow structure are essentially aligned through the thickness of the interconnect. For such alignment, the vias within one or more of the layers must have a high density to prevent leakage of fuel gas to the cathode side of a tri-layer cell or air (or oxygen) to the anode side of a tri-layer cell. In particular, it is desirable that the via fill material within the separator layer be dense (i.e., impermeable to gas leakage).

Figure 6:
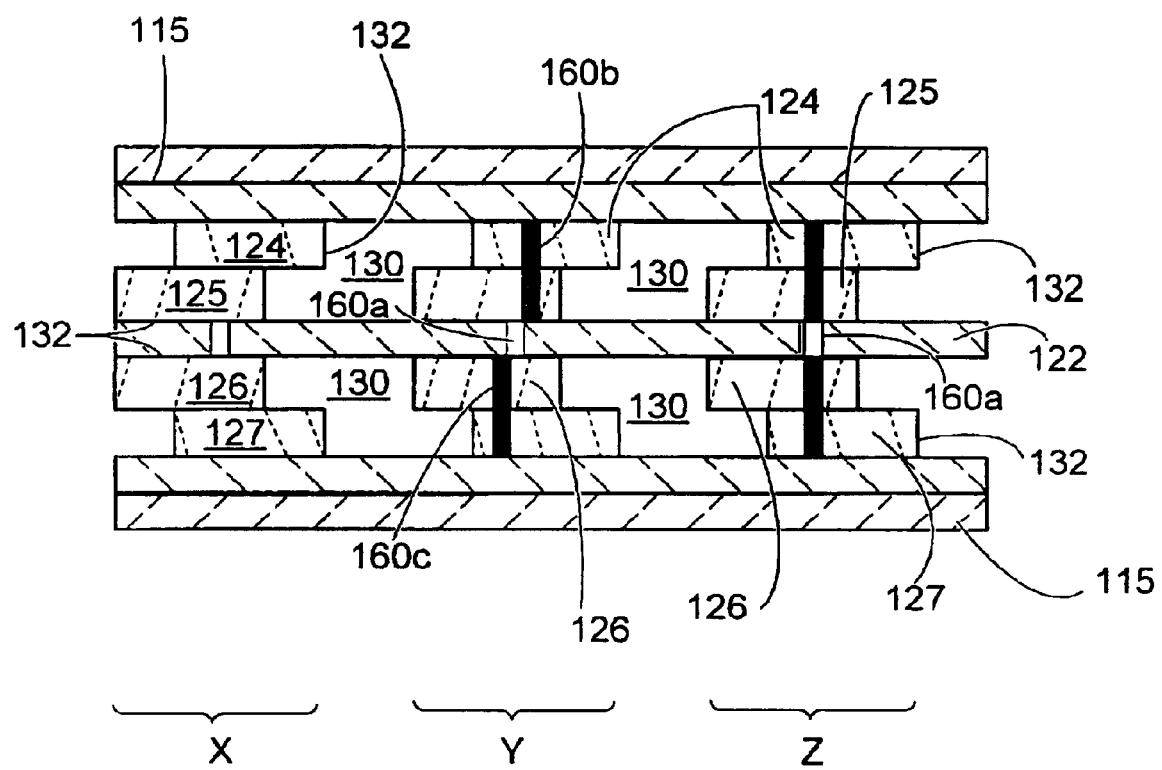
FIG. 6 is a cross sectional side taken along line A—A of FIG. 4a showing staggered and bore-coated via alignments of the present invention.

In contrast, region Y of FIG. 6 illustrates "staggered vias". In such a design, vias 160a, 160b, 160c in one or more layers are offset such that there is no overlap between the vias in the adjacent offset layers. When using staggered vias, a conducting layer 134 must be added to electrically connect the vias. The conducting layer 134 must be compatible with adjacent via materials, and generally is constructed from materials similar to the vias. Experience has shown that the use of staggered vias should lessen the need for impermeability of the fill materials and for chemical compatibility of the elements of the interconnect, and particularly the via materials.

As with any fuel cell stack, the final, assembled elements must be sealed to prevent leakage of the reactant gases. Specifically, an essentially airtight seal around the edges of the tri-layer 115 and the interconnect 120 is of the utmost importance. Such a seal may also provide structural strength and/or stability. In this regard, the present invention is a substantial improvement over previous designs because the flow fields for the reactant gases are integrated into the interconnect 120, thereby reducing the overall area and volume where an airtight seal must be provided. Furthermore, as described below, the co-firing of the ceramic tapes used to create the interconnect provides for a less reactive, essentially airtight seal, thereby eliminating the need for sealing of the various ceramic sheets.

As will be readily appreciated by those skilled in the art, the sealing material(s) must be compatible with the ceramic of the flow fields of the interconnect. Likewise, the material selected must not contaminate the anode or cathode of the tri-layer cell with foreign species that might cause degraded performance. Accordingly, although other materials are contemplated, the sealing material preferably comprises the same (or one that is substantially similar to) material that is used to construct the interconnect.

Sealing may be accomplished according to any known procedure, although either a co-fired ceramic approach or a separate or subsequently applied sealant material approach are the preferred methods. In regards to a co-fired approach, an entire ceramic stack (interconnect and tri-layers) would be subjected to a heat-treatment in a manner that induced bonding between the constituent elements. Although such co-fired methods are still the subject of numerous developmental efforts, the inventors believe that the materials and principles disclosed herein appear to be most promising in terms of co-firing potential.

Application of sealants, and the optional use of sustained compressive force, appear to be another viable option for sealing the interconnect to the remaining stack elements. Notably, to the extent the interconnect used herein may be implemented in combination with elements that are not conducive to co-firing, use of sealant/compressive force may be necessary for efficient operation of the stack. In any event, the selected sealant should be non-conducting and relatively dense, possess a fine porosity (in order to minimize leakage), match the CTE of the constituent elements of the stack, and adhere to the surfaces to which it is applied.

Another key objective of the present invention is to minimize displacement caused by the thermal expansion of the stack components at operating temperatures. Consequently, the CTE of the materials used should be substantially similar. To the extent that the flow fields of the present invention are integrated into the interconnect structure as additional ceramic sheets of the same material, this matching task is simplified to a certain degree. Nevertheless, to achieve the desired performance, the range of materials options for solid oxide fuel cell electrolytes, anodes and cathodes are somewhat limited.

For example, yttria stabilized zirconia (YSZ) compositions containing on the order of 6–8 mole percent yttria are most widely used for solid oxide fuel cell electrolytes. For a cell based on a YSZ electrolyte, minimal displacements are achieved when the interconnect is constructed using a YSZ composition or one of the aforementioned ceramic materials, such as ceria based electrolytes or doped-$LaGaO_3$ electrolytes. To minimize displacements within the interconnect, each of the ceramic layers comprising the gas separator, the fuel flow structure and the air flow structure are constructed using a YSZ composition or one of the aforementioned ceramic materials. Likewise, the CTEs must be substantially matched between the fuel-side via material and the fuel flow layer(s), between the air-side via materials and the air flow layer(s), and the separator via material(s) and the separator layer(s). While considerable attention is focused upon YSZ, it is significant to note that any ceramic possessing the qualities discussed herein is expressly contemplated by this disclosure.

The following specific examples are provided to further illustrate specific ways to maximize the principles discussed above. Nevertheless, it is imperative to keep in mind that these examples are merely illustrative and not necessarily intended to limit applicants' invention, so that to the materials and methods described in the examples are merely illustrative rather than limiting.

EXAMPLE I

In a first example, a cross-flow interconnect with 2 ceramic sheets in the fuel gas flow field and 4 ceramic sheets in the air flow field is contemplated. Adding 2 more layers for the separator plate gives 8 total layers of 3 mole percent yttria stabilized zirconia (YSZ). These are tape cast to a uniform thickness between 0.3 and 0.7 mm. A via aperture pattern is then selected to optimize functionality consistent with the principles described above, and the via apertures are then punched into all eight layers according to known ceramic handling procedures.

These via apertures are then filled using a paste or ink, which is screen printed into each via aperture. Ideally, the paste/ink contains equal amounts of Pt and 3 mole percent YSZ by volume. In any event, when fired, the paste should produce a material having a conductance between 500 and 700 S/cm The via aperture diameter is optimally between 0.3 mm and 0.7 mm. Ultimately, the diameter of the via apertures may be increased in order to compensate for a via paste of lower-than-ideal conductance.

An additional set of apertures between 4 and 5 mm in diameter are punched into six of the eight layers in an approximate hexagonal pattern with center-to-center spacing between 6 and 6.4 mm in order to form the appropriate reactant flow fields. Care must be taken to ensure that the vias are properly aligned in a straight-through orientation. In particular, the fuel gas flow structure comprises two sheets in an offset pattern. The apertures should overlap by between 0.7 and 1.3 mm to create adequate gas flow passages. Manifolding and sealing for fuel gas flow are provided in a cross-flow orientation relative to the air flow. The air flow field consists of four sheets with two sheets having the same aperture orientation placed on top, and the remaining two sheets placed in an offset orientation (relative to the top sheets) beneath. Aperture diameters and spacing in the air flow sheets are similar to the fuel flow sheets.

The final two, via-only sheets are interposed between the fuel gas and air sheet layers in order to form a gas separator plate. These eight layers are then laminated in order to form a monolithic "green" structure. Excess green portions of the monolith are excised from the structure, and the excised, laminated monolith is co-fired at an appropriately high temperature, preferably above 1300° C. The final, co-fired product should then be inspected for structural integrity and proper via alignment prior to being incorporated between tri-layered cells in a final SOFC stack.

However, it should be noted that solid vias created using this method require formation of relatively small openings in each layer. These openings are then filled with a paste by screen printing (or other techniques known in the art). After co-firing, the particles in the paste sinter together to form a relatively dense "plug". The diameter of a solid via is generally limited to a maximum value that is on the order of the thickness of the individual layers. As a result, the cross-sectional area for the via, and hence the conductance, is limited.

EXAMPLE II

A second example focuses upon bore-coated vias, in contrast to the solid vias of Example I above. As mentioned above, the conductivity for the via conductor(s) must be relatively high in order to achieve the desired level of resistance for the interconnect. For the design shown in Example I, the target resistance may be achieved using vias having a diameter of 0.5 mm when the via material has a conductivity of about 600 S/cm or higher. However, for the air-side vias, it may be difficult to develop materials having sufficient conductivity, while at the same time having an acceptable CTE match.

As mentioned above, one possible approach to attacking this issue is to simply make the vias larger. However, the diameter of solid vias is generally limited to about the thickness of each individual layer due to the difficulties encountered in constructing the ceramic sheets. Bore-coated vias provide alternative conducting pathways within the gas flow structures that allows the use of materials having lower conductivity. As will be explained below, bore-coated vias also have additional advantages.

Bore-coated vias utilize existing holes (or slots) that are formed in the layers for other functions (such as reactant gas flow). In this case, the holes in each layer providing for air and fuel gas flow are used. The bore-coated vias are produced by applying the desired conductor paste to the internal bore of selected holes using a screen printing process. A conductor paste (possibly a different composition) must also be applied to the surface of each layer in selected locations to connect vias in one layer to the vias in adjacent layers. Standard lamination and co-firing operations are used to complete interconnect fabrication. Nevertheless, any known method for depositing or otherwise creating a coating on the exposed surfaces of the apertures of the sheets is contemplated (whether individually during initially tape-casting/construction or as a whole after the sheets have been assembled/fired).

There are several advantages offered by using bore-coated vias as opposed to solid vias. Foremost, bore-coated vias offer increased cross-sectional area for the conductors, thus providing for lower resistance to current flow as compared to solid vias when using the same conductor material. Resistance issues are particularly troublesome when using a perovskite oxide conductors (the preferred family of conductor materials for air-side vias), because compositions having the highest conductivity also generally have unacceptably high CTE values. Altering the composition to reduce the CTE to acceptable levels for matching the CTE of the interconnect layers results in materials with inadequate conductivity for use in solid vias. Thus, bore-coated vias offer greater flexibility in the selection of via compositions.

Bore-coated vias also offer greater flexibility in the selection of materials that are more compatible with the manufacturing process. In particular, it is advantageous to perform the co-firing operation for interconnects using an oxidizing atmosphere (e.g., air). At the same time, Ni-cermets are preferred materials for fuel-side vias, as they can be formulated to have a relatively high electrical conductivity and are stable in the reducing fuel gas atmosphere that is present during stack operation. However, when such Ni-cermets are fired in air, the Ni is oxidized to form NiO, which is not electrically conductive such that the NiO must be reduced back to Ni prior to operating the fuel cell stack (thereby increasing manufacturing costs). Moreover, if dense, solid Ni-cermet vias are used it becomes difficult, if not impossible, to fully reduce the NiO back to Ni, as the reducing gas atmosphere cannot readily access the vias that are buried within the fuel flow structure. In contrast, when the bore-coated vias are used, the NiO material on the exposed walls of the apertures is fully exposed to the reducing gas atmosphere, thereby facilitating the reduction of NiO to Ni to form the desired conducting cermet.

Bore-coated vias are also less sensitive to mismatched CTE values and, more generally, thermal expansion displacements in comparison to solid vias because solid vias are buried within the layer of ceramic material and are therefore mechanically constrained. A substantial difference between the CTE values for the solid via fill material and the ceramic body would lead to high stresses and deleterious displacements when the interconnect is exposed to changes in temperature. On the other hand, because bore-coated vias are coatings on the inside bore of holes (or slots), the material does not experience the same types of constraints. As a result, the stresses and associated displacements are lower when using bore coated vias. In essence, the lower stresses for a given CTE mismatch allows the use of via materials having a greater mismatch (and maintain stresses below a critical level).

In practice, the inside bore of the holes within the fuel flow structure are coated with a fuel-side via material. A fuel-side conductor material is applied to selected locations on the surface of the ceramic layers comprising the fuel flow structure. This conductor connects the bore-coated vias to each other while simultaneously connecting both the cell/interconnect (top surface) and the air flow structure/fuel-side vias within the separator. Likewise, an air-side conductor is applied to the inside bore of holes within the air flow structure for essentially the same purposes.

The conductor composition of the bore-coated vias for either side (fuel or air) may be the same as that used for the surface conductor (and/or for any solid vias present in the overall interconnect structure). Materials used for fuel-side bore-coated vias and surface conductors may include (but are not limited to): noble metals, such as silver, palladium, gold or platinum, or alloys formed from these metals, and ceramic-metal composites (cermets). Cermets can be prepared by combining the any such metals with ceramic materials, such as alumina, magnesium aluminum spinel, YSZ, titania and ceria (fuel-side only). Compositions using nickel, chromium, high-chromium alloys, NiO or $Cr_2O_3$ (NiO and $Cr_2O_3$ must be subsequently reduced to metal form using any number of known processes in order to have the interconnect structure function most efficiently) may all also be used on the fuel-side. Conducting oxide ceramics, such as those generally classified as being in the perovskite family, or mixtures of such ceramics and the aforementioned metals may be used on the airside. Examples of such perovskites include, doped rare earth manganites, doped rare earth cobaltites, and doped rare earth ferrites, and mixtures thereof. Other oxide conductor compositions include mixtures of indium oxide, zirconium oxide, praseodymium oxide, tin oxide and titanium oxide.

Notwithstanding the foregoing discussion, it is significant to note that, as with a solid-via interconnect, the separator plate within a bore coated interconnect must still be sufficiently dense enough to segregate the reactant gases. As such, solid vias must still penetrate the separator plate. Also, as mentioned above, a conductor layer may be interposed between the separator plate and the ceramic sheets forming the flow fields, to insure electrical connection between the separator plate vias and the bore coated vias. Such materials are known to those skilled in the art.

Finally, use of both solid vias and bore-coated vias might be particularly useful in the event that a via material has excellent CTE match but relatively low conductivity (a likely situation, especially for the air flow structure). The use of both types of vias in this situation will provide for maximum cross-section of conductor for the air flow structure, and hence the lowest resistance.

EXAMPLE III

A final example focuses on a co-flow design having solid-filled vias and individual channel shaped apertures within the ceramic sheets. The design includes initial distribution plenums, thereby facilitating co-flow or counter-flow arrangements for fuel and airflow. A slot-like arrangement of apertures are individually connected to the plenum via a series of restrictive orifices, and further downstream, cross-flow between the individual slots is optimally minimized or eliminated altogether. Such an arrangement should be a co-flow configuration in order to allow for better distribution of reactant gases and overall performance control for the stack. This setup is also in contrast to the overlapping holes and cross-flow arrangement in Example I. This particular design may also be easily converted into a counter-flow configuration simply by providing the reactant gas sources at opposite ends of the stack.

Use of elongated slots should facilitate the creation of a via arrangement. In particular, vias need only be aligned in strips such that no flow-field apertures are interposed between vias along a single line (if thought of in geometric terms, there would be a via only arrangement along the x-axis, while apertures would be placed inbetween each row of vias on the y-axis). In turn, the slots would overlap in the same direction as the reactant gas flow, and any sideways flow is eliminated. This arrangement should increase the overall strength of the resulting ceramic sheets, while minimizing expenses in the event that a bonding layer or contact pads are used to promote electrical connections between the vias in each layer. When stacked together, the sheets form a series of distinct channels whose flowpath undulates between the tri-layer and the separator plate.

The co-flow and counter-flow stack designs offer other significant advantages over the cross-flow design. For example, these advantages may include: reduced air flow requirements because of the improved reactant distribution across the entire tri-layer surface, as well as lower temperature gradients and improved air and fuel distribution within the stack. Moreover, this design takes advantage of the strengths associated with multi-layer ceramic manufacturing methods.

The materials of construction and the basic processes used to fabricate the co-flow (or counter-flow) interconnect are similar to those used to fabricate cross-flow interconnects. The thickness of individual layers and the size and spacing of slots are driven by pressure drop considerations, based upon certain approximated operating conditions (total air and fuel flow rates, reactivity of the tri-layer cells, temperature gradients, etc.). If used, the plenum and orifice sizes will be dictated by fluid dynamic considerations well known to those skilled in the art, although it should be noted that the individual orifices contemplated in this arrangement will, by necessity, be substantially smaller than the apertures to which they are fluidically connected and the orifices must be located in a position upstream relative to the apertures/channels. Use of orifices in conjunction with apertures arranged as individual channels should find particular applicability to the fuel gas inlet side of each tri-layer. Finally, as above, the via size and spacing can also be manipulated to provide for sufficient cross-section of conductors to ensure that the target resistance is achieved.

Adjustment to the size of the apertures, provision for orifices and the plenum itself should help to compensate for limitations presented by certain ceramic manufacturing techniques. For example, to the extent that precise reproducibility of the thickness and flatness of the ceramic sheets which form the flow-fields and/or the separator plate may be difficult, the configuration described above may be fine tuned, especially with respect to the size of the orifices, in order to mask these manufacturing variations. In any event, those skilled in the art of fluid dynamics will readily appreciate that control of the surface area and/or diameter of the apertures and/or orifices will have a direct and substantial effect upon the pressure drop observed which itself contributes to the controlled delivery of reactant to any given part of the tri-layer cell(s) and the performance of the stack itself.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

What is claimed is:

1. A solid oxide fuel cell assembly comprising:

first and second fuel cell layers each having an anode, a cathode and an electrolyte layer separating the anode and the cathode;

a separator plate having a defined thickness, a top face and a bottom face;

a first flow field element located between the top face of the separator plate and the first fuel cell layer, the first flow field element having a defined thickness and integrated means for delivering a reactant gas through the first flow field element and to the first fuel cell layer;

a second flow field element located between the bottom face of the separator plate and the second fuel cell layer, the second flow field element having a defined thickness and integrated means for delivering a reactant gas through the second flow field element and to the second fuel cell layer; and means for conducting an electrical current from the first fuel cell layer through the first flow field element, the separator plate and the second flow field element, the means for conducting being integrated into a portion of each of: the separator plate, the first flow field element and the second flow field element.

2. An assembly according to claim 1, wherein the first flow field element comprises a plurality of flat members; wherein each member has a plurality of apertures; and wherein the members are arranged in a stack so that the apertures form a flow path for the reactant gas.

3. An assembly according to claim 2, wherein the flat members are formed of a ceramic material.

4. An assembly according to claim 3, wherein the ceramic material includes at least one composition selected from the group consisting of: ytrria stabilized zirconia, alumina, magnesium alumina spinel, titania, ceria and mixtures thereof.

5. An assembly according to claim 4, wherein the means for conducting an electrical current comprises a connected pattern of conductive vias situated through each of: the separator plate, each flat member of the first flow field element and the second flow field element.

6. An assembly according to claim 5, wherein at least a portion of the conductive vias include at least one composition selected from the group consisting of: noble metals, alloys of noble metals, nickel, chromium, alloys of chromium, conducting oxide ceramics and ceramic-metal composites.

7. An assembly according to claim 6, wherein the means for conducting an electrical current further comprises a conductive coating applied to at least a portion of each of the following: an outer surface of each flat member of the first flow field element, the top face of the separator, the bottom face of the separator and an outer surface of the second flow field element; and wherein the conductive coating is electrically connected to at least a portion of the conductive vias.

8. An assembly according to claim 7, wherein the conductive coating includes any composition selected from the group consisting of: noble metals, alloys of noble metals, nickel, chromium, alloys of chromium, conducting oxide ceramics and ceramic-metal composites.

9. An assembly according to claim 4, further comprising a conductive coating applied to at least a portion of each of the following: an outer surface of each flat member of the first flow field element, the top face of the separator, the bottom face of the separator and an outer surface of the second flow field element.

10. An assembly according to claim 9, wherein the conductive coating includes at least one composition selected from the group consisting of: noble metals, alloys of noble metals, nickel, chromium, alloys of chromium, conducting oxide ceramics and ceramic-metal composites.

11. An assembly according to claim 1, further comprising a conductive coating applied to at least a portion of each of the following: an outer surface of each flat member of the first flow field element, the top face of the separator, the bottom face of the separator and an outer surface of the second flow field element.

12. An assembly according to claim 11, the conductive coating includes at least one composition selected from the group consisting of: noble metals, alloys of noble metals, nickel, chromium, alloys of chromium, conducting oxide ceramics and ceramic-metal composites.

13. An assembly according to claim 1, wherein the means for conducting an electrical current comprises a connected pattern of conductive vias situated through each of: the separator plate, each flat member of the first flow field element and the second flow field element.

14. An assembly according to claim 13, wherein at least a portion of the conductive vias includes at least one composition selected from the group consisting of: noble metals, alloys of noble metals, nickel, chromium, alloys of chromium, conducting oxide ceramics and ceramic-metal composites.

15. An assembly according to claim 14, wherein the means for conducting an electrical current further comprises a conductive coating applied to at least a portion of each of the following: an outer surface of each flat member of the first flow field element, the top face of the separator, the bottom face of the separator and an outer surface of the second flow field element; and wherein the conductive coating is electrically connected to at least a portion of the conductive vias.

16. An assembly according to claim 15, wherein the conductive coating includes any composition selected from the group consisting of: noble metals, alloys of noble metals, nickel, chromium, alloys of chromium, conducting oxide ceramics and ceramic-metal composites.

17. An assembly according to claim 8, wherein the separator plate is formed of a dense ceramic material.

18. An assembly according to claim 17, wherein the dense ceramic material includes at least one composition selected from the group consisting of: ytrria stabilized zirconia, alumina, magnesium alumina spinel and mixtures thereof.

19. An assembly according to claim 18, wherein the apertures are elongated slots arranged in a series of rows and wherein the flowpath is a series of individual, undulating channels.

20. An assembly according to claim 19, further comprising restrictive orifices for regulating the flow of reactant gas into the individual, undulating channels.

21. An assembly according to claim 20, further comprising an integrated distribution plenum located proximate to an outer edge of the first flow field element and in fluidic contact with the orifices.

22. An assembly according to claim 18, wherein the apertures are arranged in an overlapping pattern of holes having a diameter selected to optimize flow properties of the reactant gas passing through the apertures.

23. An assembly according to claim 18, further comprising sealing means for containing gases within an area surrounding the separator plate, the flat members of the first flow field element, the second flow field element and the first and second fuel cell layers.

24. An assembly according to claim 23, wherein the sealing means consists of at least one of: a sealant material and means for applying a compressive force.

25. An assembly according to claim 10, wherein the separator plate is formed of a dense ceramic material.

26. An assembly according to claim 25, wherein the dense ceramic material includes at least one composition selected from the group consisting of: ytrria stabilized zirconia, alumina, magnesium alumina spinel and mixtures thereof.

27. An assembly according to claim 2, wherein the apertures are elongated slots arranged in a series of rows and wherein the flowpath is a series of individual, undulating channels.

28. An assembly according to claim 27, further comprising restrictive orifices for regulating the flow of reactant gas into the individual, undulating channels.

29. An assembly according to claim 28, further comprising an integrated distribution plenum located proximate to an outer edge of the first flow field element and in fluidic contact with the orifices.

30. An assembly according to claim 2, wherein the apertures are arranged in an overlapping pattern of holes having a diameter selected to optimize flow properties of the reactant gas passing through the apertures.

31. An assembly according to claim 1, wherein the separator plate is formed of a dense ceramic material.

32. An assembly according to claim 31, wherein the dense ceramic material includes at least one composition selected from the group consisting of: ytrria stabilized zirconia, alumina, magnesium alumina spinel and mixtures thereof.

33. A layered fuel cell interconnect apparatus, the apparatus comprising:
   a first set of flat plates, each plate having a pattern of apertures and a first means for conducting an electrical current through the first set of plates, the first set of the plates being arranged in a stack so that the apertures of each plate form a flowpath for a first reactant gas;
   a second set of flat plates, each plate having a pattern of apertures and a second means for conducting an electrical current through the second set of plates, the second set of plates being arranged in a stack so that the apertures of each plate form a flowpath for a second reactant gas; and
   at least one separator plate having a series of filled vias electrically connected to the first means for conducting an electrical current on one side of the separator plate and to the second means for conducting an electrical current on an opposite side of the separator plate, the separator plate being positioned between the first set of plates and the second set of plates so as to segregate the first reactant gas from the second reactant gas.

34. An assembly according to claim 33, wherein the first set of plates and the second set of plates are both formed of a ceramic material.

35. An assembly according to claim 34, wherein the ceramic material includes at least one composition selected from the group consisting of: ytrria stabilized zirconia, alumina, magnesium alumina spinel, titania and ceria.

36. An assembly according to claim 33, wherein the first means for conducting an electrical current comprises a connected pattern of conductive vias, the conductive vias being electrically connected to the filled vias of the separator plate.

37. An assembly according to claim 36, wherein the second means for conducting an electrical current comprises a connected pattern of conductive vias, the conductive vias being electrically connected to the filled vias of the separator plate.

38. An assembly according to claim 33, wherein the first reactant gas comprises a fuel gas for a fuel cell and wherein the first means for conducting an electrical current is formed of at least one composition selected from the group consisting of: silver; palladium; gold; platinum; alloys of silver; alloys of palladium; alloys of gold; alloys of platinum; nickel; chromium; high-chromium alloys; and cermets formed by combining at least one of the following metals: nickel, chromium and high chromium alloys, with at least one of the following ceramic materials: alumina, magnesium aluminum spinel, ceria, YSZ, titania, doped-titania and other such n-type oxide conductors; and any mixture thereof.

39. An assembly according to claim 38, wherein the second reactant gas comprises an oxidant gas for a fuel cell and wherein the second means for conducting an electrical current is formed of at least one composition selected from the group consisting of: silver; palladium; gold; platinum; alloys of silver; alloys of palladium; alloys of gold; alloys of platinum; cermets prepared by combining a metal with at least one of the following ceramic materials: alumina, magnesium alumina spinel and YSZ; p-type conducting oxide ceramics; Sn-doped indium oxide; Pr-doped indium oxide; indium oxide; zirconium oxide; praseodymium oxide; tin oxide; titanium oxide; doped rare earth manganites, doped rare earth cobaltites; doped rare earth ferrites; and any mixture thereof.

40. An assembly according to claim 33, wherein the first reactant gas comprises an oxidant gas for a fuel cell and wherein the first means for conducting an electrical current is formed of at least one composition selected from the group consisting of: silver; palladium; gold; platinum; alloys of silver; alloys of palladium; alloys of gold; alloys of platinum; cermets prepared by combining a metal with at least one of the following ceramic materials: alumina, magnesium alumina spinel and YSZ; p-type conducting oxide ceramics; Sn-doped indium oxide; PR-doped indium oxide; indium oxide; zirconium oxide; praseodymium oxide; tin oxide; titanium oxide; doped rare earth manganites, doped rare earth cobaltites; doped rare earth ferrites; and any mixture thereof.

41. An assembly according to claim 36, wherein the first reactant gas comprises a fuel gas for a fuel cell and wherein the first means for conducting an electrical current is formed of at least one composition selected from the group consisting of: silver; palladium; gold; platinum; alloys of silver; alloys of palladium; alloys of gold; alloys of platinum; nickel; chromium; high-chromium alloys; and cermets formed by combining at least one of the following metals: nickel, chromium and high chromium alloys, with at least one of the following ceramic materials: alumina, magnesium aluminum spinel, ceria, YSZ, titania, doped-titania and other such n-type oxide conductors; and any mixture thereof.

42. An assembly according to claim 36, wherein the first reactant gas comprises an oxidant gas for a fuel cell and wherein the first means for conducting an electrical current is formed of at least one composition selected from the group consisting of: silver; palladium; gold; platinum; alloys of silver; alloys of palladium; alloys of gold; alloys of platinum; cermets prepared by combining a metal with at least one of the following ceramic materials: alumina, magnesium alumina spinel and YSZ; p-type conducting oxide ceramics; Sn-doped indium oxide; Pr-doped indium oxide; indium oxide; zirconium oxide; praseodymium oxide; tin oxide; titanium oxide; doped rare earth manganites, doped rare earth cobaltites; doped rare earth ferrites; and any mixture thereof.

43. An assembly according to claim 33, wherein the separator plate comprises at least one layer of a dense ceramic material.

44. An assembly according to claim 43, wherein the dense ceramic material includes at least one composition selected from the group consisting of: ytrria stabilized zirconia, alumina, magnesium alumina spinel and any mixture thereof.

45. An assembly according to claim 33, wherein the apertures for at least one of: the first set of plates and the second set of plates, have at least one of the shapes selected from the group consisting of: circles, ovals, triangles, rectangles, pentagons, hexagons and higher order polygons.

46. An assembly according to claim 45, wherein the shape of the apertures of a specific plate have varying dimensions relative to other apertures on the specific plate.

47. An assembly according to claim 45, wherein the shape of the apertures are selected to favorably influence pressure drop of the first and second reactant gases within each respective set of plates.

48. An assembly according to claim 33, wherein the pattern of apertures for at least one of: the first set of plates and the second set of plates, are arranged to form individual channels running along a length of each plate.

49. An assembly according to claim 48, wherein the individual channels possess an inlet with a defined size and further comprising orifice means for regulating entry of reactant gas flow into the individual channel are fluidically connected to each channel inlet, wherein each orifice means is smaller than the channel inlet to which each orifice means is connected.

50. An assembly according to claim 49, further comprising a distribution plenum fluidically connected to every orifice means, the distribution plenum being positioned in an upstream position relative to the individual channels.

51. A method for constructing an interconnect apparatus for use in a fuel cell stack, the method comprising:
   providing a plurality of flat members capable of forming a separate reactant gas flow field;
   providing an impermeable separator plate;
   forming a pattern of apertures on each flat member;
   providing a material capable of conducting an electrical current to the separator plate and to at least a portion of the flat members;
   stacking the flat members on both sides of the separator plate so as to surround the separator plate;
   aligning the flat members on each side of the separator plate so as to insure a viable electrical connection exists throughout the flat members and the separator plate and so as to insure the pattern of apertures in the stacked members forms a flow field for reactant gases on each side of the separator plate; and
   sealing the stacked and aligned flat members and separator plate to insure that reactant gases are contained within the flow field on each side of the separator plate.

52. A method according to claim 51, wherein the flat members are formed of a ceramic material.

53. A method according to claim 52, wherein the ceramic material is at least one composition selected from the group consisting of: ytrria stabilized zirconia, alumina, magnesium alumina spinel, titania, ceria and mixtures thereof.

54. A method according to claim 51, wherein the separator plate is formed of a dense ceramic material.

55. A method according to claim 54, wherein the ceramic material is at least one composition selected from the group consisting of: ytrria stabilized zirconia, alumina, magnesium alumina spinel and mixtures thereof.

56. A method according to claim 52, wherein the flat members are formed by a tape-casting process.

57. A method according to claim 54, wherein the separator plate is formed by a tape casting process.

58. A method according to claim 51, wherein the providing a material capable of conducting an electrical current further comprises: forming apertures in the separator plate and placing a dense conductive material in the apertures of the separator plate.

59. A method according to claim 58, wherein the providing a material capable of conducting an electrical current further comprises: forming apertures in each flat member and placing a conductive material in the apertures of each flat member.

60. A method according to claim 59, wherein the dense material for the separator plate is at least one composition selected from the group consisting of: noble metals, alloys of noble metals, nickel, chromium, alloys of chromium, conducting oxide ceramics and ceramic-metal composites; and wherein the conductive material for each flat member is at least one composition selected from the group consisting of: noble metals, alloys of noble metals, nickel, chromium, alloys of chromium, conducting oxide ceramics and ceramic-metal composites.

61. A method according to claim 51, wherein the providing a material capable of conducting an electrical current further comprises: forming apertures in each flat member and placing a conductive material in the apertures of each flat member.

62. A method according to claim 61, wherein the conductive material for each flat member is at least one composition selected from the group consisting of: noble metals, alloys of noble metals, nickel, chromium, alloys of chromium, conducting oxide ceramics and ceramic-metal composites.

63. A method according to claim 51, wherein the providing a material capable of conducting an electrical current further comprises: forming apertures in the separator plate, placing a dense conductive material in the apertures of the separator plate, and depositing a continuous layer of a conductive material on at least a portion of exposed surfaces of the flow field on at least one side of the separator plate.

64. A method according to claim 63, wherein the dense material for the separator plate is at least one composition selected from the group consisting of: noble metals, alloys of noble metals, nickel, chromium, alloys of chromium, conducting oxide ceramics and ceramic-metal composites; and wherein the conductive material for each flat member is at least one composition selected from the group consisting of: noble metals, alloys of noble metals, nickel, chromium, alloys of chromium, conducting oxide ceramics and ceramic-metal composites.

65. A method according to claim 51, wherein forming the apertures further comprises: forming a pattern of apertures on each flat member in at least one shape selected from the group consisting of: circles, ovals, triangles, rectangles, pentagons, hexagons and higher order polygons.

66. A method according to claim 65, wherein the shape of the apertures of a specific flat member have varying dimensions relative to other apertures on the specific flat member.

67. A method according to claim 65, wherein the shape of the apertures are selected to favorably influence pressure drop of reactant gases within each flow field.

68. A method according to claim 51, wherein the sealing the stacked and aligned flat members and separator plate further comprises: applying an adhesive sealant material to all outer edges of the flat members and to all outer edges of the separator plate.

69. A method according to claim 51, wherein the sealing the stacked and aligned flat members and separator plate further comprises: applying a compressive force to the stacked and aligned flat members and separator plate.

70. A method according to claim 51, wherein the aligning the flat members further comprises: insuring that the flow field on each side of the separator plate includes an inlet fluidically connected to each flow field along one edge of the stacked and aligned flat members and separator plate and an outlet fluidically connected to each flow field along a separate edge of the stacked and aligned flat members and separator plate; and wherein the sealing the stacked and aligned flat members and separator plate further comprises: insuring that reactant gases enter the stacked and aligned flat members and separator plate only through the inlets and that reactant gases exit only through the outlets.

71. A method according to claim 70, further comprising: prior to sealing the stacked and aligned flat members and separator plate, forming at least one restrictive orifice at a position upstream relative to the inlets.

72. A method according to claim 71, further comprising: prior to sealing the stacked and aligned flat members and separator plate, forming a distribution plenum fluidically connected to the restrictive orifice.

73. A method according to claim 52, wherein the separator plate is formed of a dense ceramic material.

74. A method according to claim 73, wherein the flat members are formed by a tape-casting process.

75. A method according to claim 74, wherein the providing a material capable of conducting an electrical current further comprises: forming apertures in the separator plate and placing a dense conductive material in the apertures of the separator plate.

76. A method according to claim 75, wherein the providing a material capable of conducting an electrical current further comprises: forming apertures in each flat member and placing a conductive material in the apertures of each flat member.

77. A method according to claim 76, wherein forming the apertures further comprises: forming a pattern of apertures on each flat member in at least one shape selected from the group consisting of: circles, ovals, triangles, rectangles, pentagons, hexagons and higher order polygons.

78. A method according to claim 77, wherein the shape of the apertures of a specific flat member have varying dimensions relative to other apertures on the specific flat member.

79. A method according to claim 78, wherein the shape of the apertures are selected to favorably influence pressure drop of reactant gases within each flow field.

80. A method according to claim 79, wherein the ceramic material is at least one composition selected from the group consisting of: ytrria stabilized zirconia, alumina, magnesium alumina spinel, titania, ceria and mixtures thereof.

81. A method according to claim 80, wherein the dense ceramic material is at least one composition selected from the group consisting of: ytrria stabilized zirconia, alumina, magnesium alumina spinel and mixtures thereof.

82. A method according to claim 81, wherein the dense material for the separator plate is at least one composition selected from the group consisting of: noble metals, alloys of noble metals, nickel, chromium, alloys of chromium, conducting oxide ceramics and ceramic-metal composites; and wherein the conductive material for each flat member is at least one composition selected from the group consisting of: noble metals, alloys of noble metals, nickel, chromium, alloys of chromium, conducting oxide ceramics and ceramic-metal composites.

83. A method according to claim 82, wherein the aligning the flat members further comprises: insuring that the flow field on each side of the separator plate includes an inlet fluidically connected to each flow field along one edge of the stacked and aligned flat members and separator plate and an outlet fluidically connected to each flow field along a separate edge of the stacked and aligned flat members and separator plate; and wherein the sealing the stacked and aligned flat members and separator plate further comprises: insuring that reactant gases enter the stacked and aligned flat members and separator plate only through the inlets and that reactant gases exit only through the outlets.

84. A method according to claim 83, further comprising: prior to sealing the stacked and aligned flat members and separator plate, forming at least one restrictive orifice at a position upstream relative to the inlets.

85. A method according to claim 84, further comprising: prior to sealing the stacked and aligned flat members and separator plate, forming a distribution plenum fluidically connected to the restrictive orifice.

86. An assembly according to claim 4, wherein the separator plate is formed of a dense ceramic material.

87. An assembly according to claim 86, wherein the dense ceramic material includes at least one composition selected from the group consisting of: ytrria stabilized zirconia, alumina, magnesium alumina spinel and mixtures thereof.

88. A method according to claim 51, wherein the step of sealing the stacked and aligned flat members and separator plate comprises co-firing.

* * * * *